July 2, 1963  P. D. HANN  3,096,383
AUTOMATIC PROCESS FOR PREVENTION OF GAS HYDRATE FORMATION
Filed May 18, 1959

INVENTOR.
P. D. HANN
BY Hudson & Young
ATTORNEYS

United States Patent Office 3,096,383
Patented July 2, 1963

3,096,383
AUTOMATIC PROCESS FOR PREVENTION OF
GAS HYDRATE FORMATION
Paul D. Hann, Bartlesville, Okla., assignor to Phillips
Petroleum Company, a corporation of Delaware
Filed May 18, 1959, Ser. No. 813,990
4 Claims. (Cl. 260—676)

This invention relates to the treatment of hydrocarbon gases. In one of its aspects, it relates to a method and apparatus for substantially eliminating the formation of gas hydrates in a system capable of forming such hydrates.

Distillate well fluids, fractionator overhead fluids, and the like, usually contain moisture in some quantity. Some of this moisture may be condensed and removed as liquid water upon cooling the fluids to atmospheric temperature, or even to temperatures somewhat higher than atmospheric. However, as is known by persons skilled in the art, at high pressures and at even relatively mild temperatures, gas hydrates can form and can plug up conduits, condensers, accumulators, etc., with detrimental results.

Prior art practice has used hydrate inhibitors continuously injected into such systems to minimize or substantially eliminate gas hydrate formation therein. However, in such prior art practice, hydrate inhibitors are added in excess of that amount actually required by the system, as a matter of safety, which type operation is wasteful of the hydrate inhibitor chemical. Further should one skilled in the art miscalculate the quantity of inhibitor to be injected continuously into the system, or if the conditions of the system change, hydrates can form and disastrous results can follow.

It is an object of my invention to automatically continuously inject into a system capable of forming gas hydrates a gas hydrate inhibitor in an optimum quantity to substantially eliminate gas hydrate formation in the system.

Another object of my invention is to substantially eliminate hydrate formation by automatically injecting the optimum amount of gas hydrate inhibitor into a system capable of forming gas hydrates in response to the differential pressure across a restriction to flow of the flowing fluid.

Yet another object of my invention is to substantially eliminate the formation of gas hydrates in a fluid system capable of forming gas hydrates by automatically injecting hydrate inhibitor in response to a differential pressure across a restriction to flow of the flowing fluid which differential pressure signal is placed in a controlling condition in response to the temperature of the flowing fluid.

These and many other advantages and objects will be realized by those skilled in the art from a careful study of the following disclosure and drawing which, respectively, describes and illustrates my invention.

According to this invention, hydrate inhibitor is added to a stream subject to hydrate formation responsive to increase in pressure differential across a restricted flow path of said stream. In a further embodiment, temperature of said stream downstream of the restricted area is continuously detected and the addition of hydrate inhibitor limited when said temperature exceeds the temperature at which hydrate forms.

The moisture content of gases capable of forming hydrates under proper conditions of temperature and pressure can vary from about 1 pound to 3500 ponds of water per million cubic feet of gas (measured at STP). More narrowly, this quantity would range between about 2 pounds of water up to saturation with water vapor per million cubic feet of gas. Hydrates can form with a very small quantity of water vapor in the gas, at various conditions of pressure and temperature; saturation conditions are not necessary for hydrate formation to occur.

The minimum quantity of inhibitor, valve 24 shut, would run about 1 pound of, e.g., methanol per million cubic feet of gas. However, the automatic system, dependent on the ΔP (differential pressure) change across the exchanger or flow restriction zone, will add the optimum quantity to the system.

Generally, the amount of inhibitor required by the system (as demanded by the ΔP and depending on the pressure and temperature of the system) will range from between about 5 to 1000 pounds of inhibitor, such as methanol, per million cubic feet of gas.

The following table illustrates the reduction in hydrate forming temperature of a gas, using methanol as the hydrate inhibitor. The results are measured by allowing a hydrate to form at its temperature and pressure conditions, and then melting the hydrate, and measuring the methanol content of the water.

| Wt. percent methanol in the water from hydrate melt: | Reduction in hydrate-forming temperature |
|---|---|
| 5 | 4 |
| 10 | 8 |
| 15 | 13 |
| 20 | 18 |
| 25 | 24 |

Figures 1, 2:
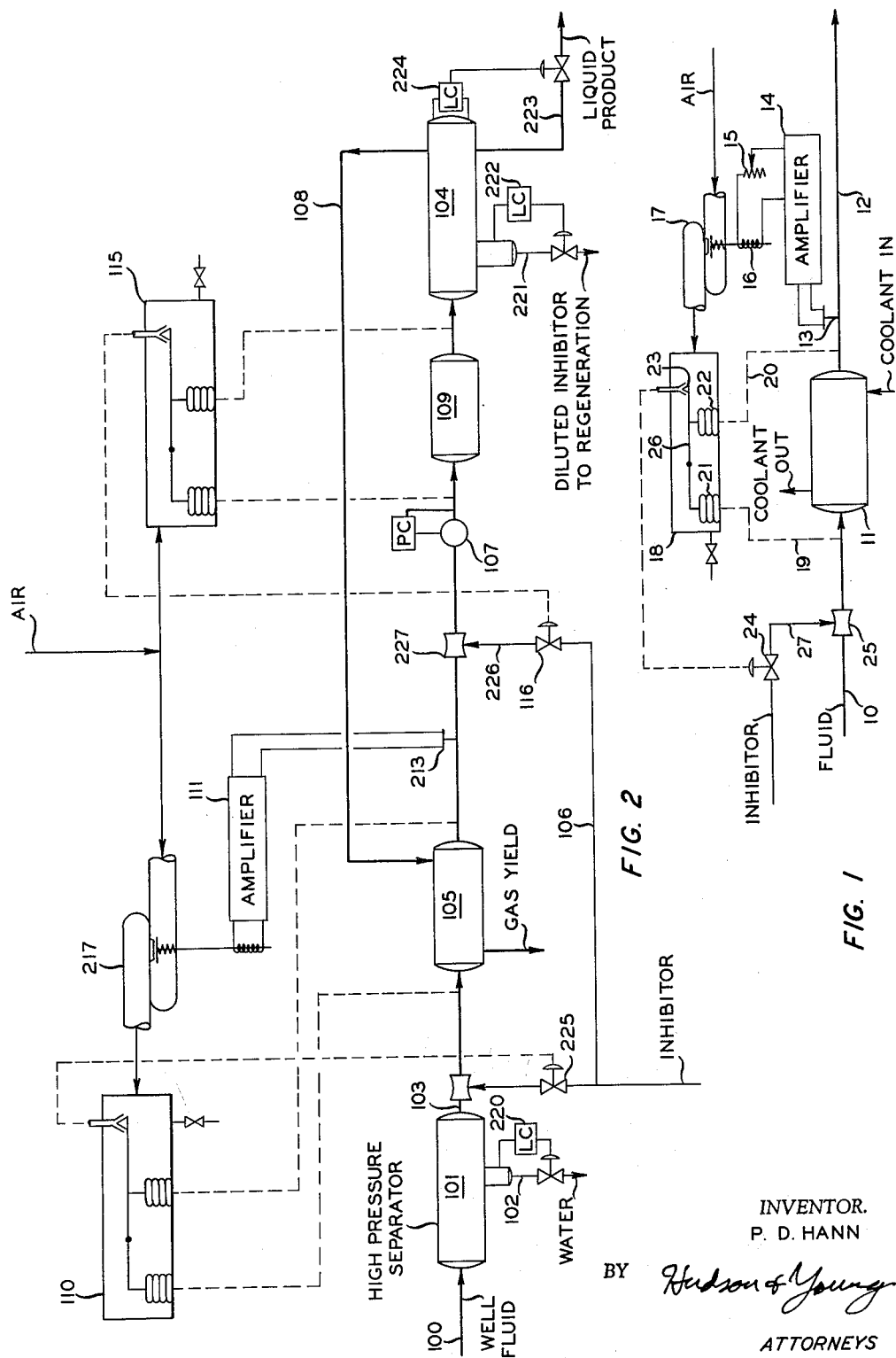
FIGURE 1 shows diagrammatically the process of my invention applied to a fluid capable of forming gas hydrates.
FIGURE 2 illustrates diagrammatically the invention as applied specifically to a well fluid capable of forming gas hydrates.

Referring to FIGURE 1, a fluid containing moisture and being capable of forming gas hydrates enters the system by way of conduit 10 and flows through heat exchanger 11 in indirect heat exchange with cooling fluid. Cooled fluid exits the heat exchanger by way of conduit 12 for further processing or usage as desired. Temperature sensing means 13, e.g., shown as a thermocouple, senses the temperature of the cooled fluid in effluent conduit 12. The signal from thermocouple 13 is amplified by conventional amplifier 14, and the amplified signal actuates positioning, through coil 16, of a solenoid air valve 17. Resistance 15 in this circuit is adjusted so that a predetermined minimum temperature measured by 13 will effect the opening of air valve 17 to admit air pressure into differential pressure controller 18. Within controller 18 are two bellows units 21 and 22 which receive pressure signals 19 and 20, respectively, from each side of the exchanger, or flow restriction, 11. This differential pressure impressed on pivoted lever 26 positions the valve 23 to admit the air pressure introduced by way of valve 17 onto motor valve 24 located in the inhibitor conduit 27. Hydrate inhibitor from storage, not shown, is educted by way of eductor 25 into the flowing fluid in conduit 10.

In the operation of FIGURE 1, valve 24 is never fully closed. When in the closed position, valve 24 allows leakage of a very small quantity of hydrate inhibitor into the fluid in line 10 so that at all times some inhibitor is being added to the fluid. This small continuous addition of inhibitor prevents a sudden build up of hydrates in the system, such sudden build up being known to those skilled in the art.

In FIGURE 1, valve 17 is actuated by solenoid coil 16. As the temperature falls to the predetermined minimum, that is, the temperature at or below which hydrates will form, the coil 16 has reduced effect and valve 17 opens to allow air to enter the differential pressure controller 18. Valve 24 is normally closed; that is, air pressure opens valve 24. When the differential pressure across exchanger 11, between conduits 10 and 12, increases, due to gas hydrate formation, valve 23 is further opened to increase the air supply to the motor of valve 24 to further open valve 24 to admit a greater quantity of hydrate inhibitor into the system. The system maintains the optimum flow of hydrate inhibitor into the system in response to the differential pressure across exchanger 11.

The temperature sensing means 13, amplifier 14, valve 17, differential pressure controller 18, valve 24, and eductor 25 shown in FIGURE 1 are conventional. The various components are illustrated diagrammatically for explanatory purposes.

Referring to FIGURE 2 which illustrates my invention applied to a well fluid capable of forming hydrates, containing moisture, passes via conduit 100 to high pressure separator 101 wherefrom a portion of the water in the fluid is removed as liquid water by means of conduit 102, on liquid level control 220. The fluid from separator 101 pases by way of conduit 103, after inhibitor injection to be described hereinbelow, to cooler, indirect heat exchanger 105. The fluid from conduit 103 is indirectly cooled in exchanger 105 by subsequently produced gas yield to be described hereinbelow. The cooled fluid from exchanger 105 passes via expansion valve 107 on pressure control to flow restrictor 109, which in the illustration is a series of tubes. This expanded fluid enters phase separator 104 from which diluted hydrate inhibitor is removed via conduit 221 on level control 222. Liquid hydrocarbon is removed via conduit 223 on level control 224, and cold product gas is removed via conduit 108 and passed in indirect heat exchange with well fluid in exchanger 105.

Thermocouple 213, amplifier 111, air valve 217, and control valve 225 are operated in the same manner as thermocouple 13, amplifier 11, air valve 17, and control valve 24 as described with reference to FIGURE 1, and repetition of explanation will not be given in describing this portion of FIGURE 2. In addition, differential pressure across restrictor 109 is sensed by differential pressure controller 115 which actuates control on valve 116 to admit additional gas hydrate inhibitor via conduit 226 to cooled fluid from exchanger 105 via eductor 227. In FIGURE 2, in this illustration, the fluid downstream of expansion valve 107 is under hydrate forming conditions of temperature and pressure, and inhibitor is continuously added in response to the differential pressure across restrictor 109.

The following specific example is based on the operation of FIGURE 2.

Well fluid 100 at well head:
  Gas specific gravity _____ 0.9
  Pressure, p.s.i.a _____ 3000
  Temperature, °F _____ 160

Contains water vapor in sufficient quantity to form gas hydrates under proper conditions of temperature and pressure as:

| Pressure, p.s.i.a.: | Temperature below which hydrates form, °F |
|---|---|
| 3000 | 79 |
| 2000 | 73 |
| 1500 | 70 |
| 1000 | 67 |
| 500 | 60 |
| 250 | 51 |
| 100 | 39 |
| 60 | 32 |

Well fluid prior to exchanger 105:
  Pressure, p.s.i.a _____ 2990
  Temperature, °F (no hydrates form) _____ 155

Well fluid after exchanger 105:
  Pressure, p.s.i.a _____ 2965
  Temperature, °F (hydrates can form) ____ 70

Well fluid prior to 109:
  Pressure, p.s.i.a _____ 1000
  Temperature, °F (hydrates can form) ____ −8

Well fluid in 104:
  Pressure, p.s.i.a _____ 970
  Temperature, °F (hydrates can form) ____ −28

The differential pressure across exchanger 105 when no hydrates are formed is about 25 p.s.i.a. When this ΔP starts to increase, due to starting of hydrate formation, and since at 2965 p.s.i.a. the temperature of the fluid is at 70° F. (below about 78° F. at which hydrates at this pressure would form) valve 217 is open to admit air into differential pressure controller 110 to actuate control of valve 225 to admit gas hydrate inhibitor, such as ethylene glycol, at a rate to maintain the ΔP of 25 p.s.i. across exchanger 105. Thus, optimum inhibitor is added at this point to prevent hydrate formation.

Similarly, since the fluid prior to 109 is under pressure and temperature conditions at which hydrates can form, the differential pressure across 109, normally about 30 p.s.i. when no hydrates are present, controls the optimum addition of gas hydrate inhibitor added thereto by way of valve 116.

Eductors are used in FIGURE 2 as in FIGURE 1 to inject the inhibitor. Such gas hydrate inhibitors are conventional and known in the art, and include the various glycols, alcohols, etc., such as methyl alcohol, ethylene glycol, n-propyl alcohol, isopropyl alcohol, n-butyl alcohol, sec-butyl alcohol, tert-butyl alcohol, iso-butyl alcohol, amyl alcohol, propylene glycol, penacol, glycerol, erythritol, and the like.

The invention is not limited to well fluid as illustrated in the example, but is applicable to fluids capable of forming gas hydrates in general, such as well fluids of various gravities, fractionator overhead fluids as deethanizer overhead, etc.

I claim:

1. A method for inhibiting hydrate formation in a gaseous hydrocarbon stream containing 1 to 3500 pounds of water vapor per million standard cubic feet of gas which comprises continuously adding a predetermined minimum of hydrate inhibitor to said stream, continuously passing the stream through a flow restriction zone comprising an indirect heat exchange zone, continuously detecting the differential pressure across said flow restriction zone by measuring the pressure of the flowing stream immediately upstream of said zone and immediately downstream of said zone to obtain said differential pressure, and introducing hydrate inhibitor into said flowing stream upstream of said zone directly responsive to changes in said measured pressure differential due to hydrate formation at said restriction zone by increasing the addition of hydrate inhibitor added to said stream when said differential pressure increases and lowering the rate of hydrate inhibitor addition toward said minimum addition rate when said differential pressure falls, thus maintaining said differential pressure substantially constant at a predetermined value.

2. The method of claim 1 wherein the predetermined minimum amount of hydrate inhibitor addition is at the rate of 5 pounds per million standard cubic feet of gas and wherein the rate of additional hydrate inhibitor introduction is varied from said 5 pounds to 1000 pounds per million standard cubic feet of gas.

3. The method of claim 1 including the steps of measuring the temperature of said flowing stream downstream of said flow restriction zone, utilizing said measured temperature to prevent addition of additional hydrate inhibitor above said predetermined minimum into said stream, and maintaining said predetermined minimum of hydrate inhibitor as the sole inhibitor addition when said measured temperature exceeds 79° F., a temperature at and below which hydrates form.

4. A method for inhibiting hydrate formation in a hydrocarbon gaseous stream containing water vapor therein and subject to hydrate formation which comprises continuously adding a predetermined minimum amount of hydrate inhibitor to said gaseous stream, flowing said gaseous stream containing said minimum amount of hydrate inhibitor through a flow restriction zone, continuously detecting the differential pressure across said flow restriction zone by measuring the pressure of said flowing stream immediately upstream of said zone and immediately downstream of said zone to obtain said pressure differential, and introducing additional hydrate inhibitor into said flowing stream upstream of said zone directly responsive to changes in said measured pressure differential due to hydrate formation at said restriction zone, the rate of additional hydrate inhibitor introduction being increased when said differential pressure increases and the rate of additional hydrate inhibitor introduction being decreased when said differential pressure decreases.

References Cited in the file of this patent

UNITED STATES PATENTS

| | | |
|---|---|---|
| 2,311,532 | Gershon | Feb. 16, 1943 |
| 2,528,028 | Barry | Oct. 31, 1950 |
| 2,682,883 | Phillips | July 6, 1954 |
| 2,818,454 | Wilson | Dec. 31, 1957 |

OTHER REFERENCES

Perry: "Chemical Engineers' Handbook," third edition, 1950, pp. 364–368.

Woolfolk: "The Oil and Gas Journal," April 21, 1952 (pages 124, 159 and 160).